US012803882B2

(12) United States Patent
Zhou et al.

(10) Patent No.: US 12,803,882 B2
(45) Date of Patent: Nov. 17, 2026

(54) SYSTEM AND METHOD FOR RECONFIGURABLE INTELLIGENT SURFACE (RIS)-ASSISTED ENERGY-EFFICIENT (EE) RADIO ACCESS NETWORK (RAN) USING HIERARCHICAL REINFORCEMENT LEARNING

(71) Applicant: Telefonaktiebolaget LM Ericsson (publ), Stockholm (SE)

(72) Inventors: Hao Zhou, Ottawa (CA); Long Kong, Ottawa (CA); Melike Erol-Kantarci, Ottawa (CA); Medhat Elsayed, Gatineau (CA); Majid Bavand, Ottawa (CA); Raimundas Gaigalas, Hässelby (SE); Steve Furr, Ottawa (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 121 days.

(21) Appl. No.: 18/862,664

(22) PCT Filed: May 5, 2023

(86) PCT No.: PCT/IB2023/054718
§ 371 (c)(1),
(2) Date: Nov. 4, 2024

(87) PCT Pub. No.: WO2023/214384
PCT Pub. Date: Nov. 9, 2023

(65) Prior Publication Data

US 2025/0350538 A1 Nov. 13, 2025

Related U.S. Application Data

(60) Provisional application No. 63/339,057, filed on May 6, 2022.

(51) Int. Cl.
*H04L 41/16* (2022.01)
*G06N 3/092* (2023.01)
(Continued)

(52) U.S. Cl.
CPC ............. *H04L 41/16* (2013.01); *G06N 3/092* (2023.01); *H04L 41/0833* (2013.01); *H04B 7/04013* (2023.05)

(58) Field of Classification Search
CPC ...... H04L 41/16; H04L 41/0833; G06N 3/092
(Continued)

(56) References Cited

U.S. PATENT DOCUMENTS

2012/0270593 A1* 10/2012 Park ...................... H04W 52/40 455/522
2020/0065703 A1* 2/2020 Nag ........................ G06F 9/542
2022/0021469 A1* 1/2022 Veijalainen ............ H04B 17/29

FOREIGN PATENT DOCUMENTS

CN 112272384 A * 1/2021 ............ H04W 24/02
CN 114615730 A * 6/2022 ............ H04W 24/02
WO 2020152389 A1 7/2020

OTHER PUBLICATIONS

International Search Report and Written Opinion dated Aug. 1, 2023 for International Application No. PCT/IB2023/054718 filed May 5, 2023; consisting of 18 pages.
(Continued)

*Primary Examiner* — Zi Ye
(74) *Attorney, Agent, or Firm* — Weisberg I.P. Law, P.A.

(57) ABSTRACT

A method, system and apparatus for reconfigurable intelligent surface-assisted energy-efficient radio access networks using hierarchical reinforcement learning are disclosed. A method in a network node operating as a meta-controller and configured to communicate with a wireless device and a plurality of sub-controllers is provided. The method includes determining a state of the meta-controller including traffic
(Continued)

load ratios of the plurality of sub-controllers. The method also includes receiving an extrinsic reward that is based on an energy efficiency of a cell including the plurality of sub-controllers. The method further includes selecting a goal according to a policy, the selected goal being an on/off state of each of the plurality of sub-controllers, the policy being selected to increase the extrinsic reward. The method includes configuring the plurality of controllers with the selected goal and an indication of the policy for selecting the goal.

18 Claims, 11 Drawing Sheets

(51) Int. Cl.
*H04L 41/0833* (2022.01)
*H04B 7/04* (2017.01)

(58) Field of Classification Search
USPC .......................................................... 709/224
See application file for complete search history.

(56) References Cited

OTHER PUBLICATIONS

Ye, J., et al.; DRAG: Deep Reinforcement Learning Based Base Station Activation in Heterogeneous Networks; IEEE Transactions on Mobile Computing, vol. 19, No. 9, Jun. 12, 2019; consisting of 12 pages.
Yu, P., et al.; Deep Learning-Based Resource Allocation for 5G Broadband TV Service; IEEE Transactions on Broadcasting, vol. 66, No. 4, Feb. 10, 2020; consisting of 14 pages.
Jaber, M., et al.; A Reinforcement Learning Approach for Wireless Backhaul Spectrum Sharing in IoE HetNets; 2020 IEEE 31st Annual International Symposium on Personal, Indoor and Mobile Radio Communications: Track 2: Networking and MAC; 2020; consisting of 6 pages.
Wu, J., et al.; Energy-Efficient Base-Stations Sleep-Mode Techniques in Green Cellular Networks: A Survey; IEEE Communication Surveys & Tutorials, vol. 17, No. 2, Second Quarter, Feb. 12, 2015; consisting of 24 pages.
Zhou, H. et al., RAN Resource Slicing in 5G Using Multi-Agent Correlated Q-Learning; 2021 IEEE International Symposium on Personal, Indoor and Mobile Radio Communications (PIMRC); Jun. 24, 2021; consisting of 6 pages.
Piovesan, N., et al.; Joint Load Control and Energy Sharing for Renewable Powered Small Base Stations: A Machine Learning Approach; IEEE Transactions on Green Communications and Networking, vol. 5, No. 1; Sep. 28, 2020; consisting 14 pages.
Wu, Q., et al.; Deep Reinforcement Learning with Spatio-temporal; Traffic Forecasting for Data-Driven Base Station Sleep Control; arXiv, Jan. 21, 2021; consisting of 14 pages.

* cited by examiner

SYSTEM AND METHOD FOR RECONFIGURABLE INTELLIGENT SURFACE (RIS)-ASSISTED ENERGY-EFFICIENT (EE) RADIO ACCESS NETWORK (RAN) USING HIERARCHICAL REINFORCEMENT LEARNING

CROSS-REFERENCE TO RELATED APPLICATIONS

This application is a Submission Under 35 U.S.C. § 371 for U.S. National Stage Patent Application of International Application No.: PCT/IB2023/054718, filed May 5, 2023 entitled "SYSTEM AND METHOD FOR RECONFIGURABLE INTELLIGENT SURFACE (RIS)-ASSISTED ENERGY-EFFICIENT (EE) RADIO ACCESS NETWORK (RAN) USING HIERARCHICAL REINFORCEMENT LEARNING," which claims priority to U.S. Provisional Application No. 63/339,057, filed May 6, 2022, entitled "SYSTEM AND METHOD FOR RIS-ASSISTED ENERGY-EFFICIENT RAN USING HIERARCHICAL REINFORCEMENT LEARNING," the entireties of both of which are incorporated herein by reference.

TECHNICAL FIELD

The present disclosure relates to wireless communications, and in particular, to reconfigurable intelligent surface (RIS)-assisted energy-efficient (EE) radio access networks (RAN) using hierarchical reinforcement learning.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and mobile wireless devices (WD), as well as communication between network nodes and between WDs. Sixth Generation (6G) wireless communication systems are also under development.

In line with previous generations of mobile wireless technologies, 5G is currently on the road to mass deployment. Meanwhile, the energy efficiency of 5G has been a significant research area in academia and industry. One of the widely considered approaches for energy efficiency has been the sleep control technique. Sleep control refers to selectively turning radio transceivers or base stations (BSs) to sleep mode.

More recently, reconfigurable intelligent surfaces (RISs) are proposed and considered as enablers for future wireless communications. An RIS is essentially an electronically operated meta-surface controlled by programmable software. A large number of small, low-cost, and passive artificial "meta-atoms" integrated into the RIS can smartly change the reflection direction towards any desired users by tuning a series of phase shifters. Accordingly, RISs have been designed for various scenarios and applications including 5G Advanced/6G, internet of things (IoT), smart cities, etc. The main benefit of RIS lies in its capability of shaping the wireless propagation environments by adjusting the signal reflections. Through this, the signal quality and connectivity can be substantially improved. Furthermore, the energy consumption of RIS is extremely low, which is a favorable property compared to traditional relaying. RIS's capability and low-power consumption features motivate investigation of RIS-aided energy-efficient RAN.

Machine learning has been generally applied for wireless network management for its advantage in handling dynamic environments. For example, in reinforcement learning (RL), the optimization problem can be transformed to the unified Markov decision process (MDPs), which avoids the complexity of defining a dedicated optimization model.

Machine learning techniques offer promising opportunities for network control and management. Deep Q-network deployment has been considered for sleep control of renewable energy-powered base stations (BSs), where the small base stations (SBSs) can share their energy by a micro-grid. Similarly, some have considered deployment of deep neural networks to predict traffic patterns, and actor-critic reinforcement learning is used for dynamic sleep control.

On the other hand, RIS, being an appealing approach, is being considered by wireless communication and signal processing communities. The machine learning-enabled RIS-assisted wireless communication systems have been under exploration in terms of channel modelling, channel estimation, energy efficiency (EE), etc. Machine learning methods are able to provide better performance than central limit theorem-based approaches.

SUMMARY

Some embodiments advantageously provide methods and network nodes for reconfigurable intelligent surface (RIS)-assisted energy-efficient (EE) radio access networks (RAN) using hierarchical reinforcement learning.

Some embodiments apply a hierarchical reinforced learning (HRL) algorithm, including a meta-controller for small base station (SBS) sleep control and sub-controllers for transmission power control. This hierarchical control strategy allows for more efficient exploration of the environment, and mitigates the long convergence issue of conventional reinforced learning (RL).

Thus, some embodiments address the problem of energy efficiency with sleep control and RIS embedded in the cellular communication systems.

In some embodiments, maximization of energy efficiency (EE) may be achieved in two ways: 1) using a macro base station (MBS) as the meta-controller to implement the sleep control of small base stations (SBSs) to save energy, and 2) using SBSs as sub-controllers to decide their own transmission power levels to reduce energy consumption. In some embodiments, an RIS is deployed to improve the signal propagation environment and increase the channel capacity.

Some embodiments include a system that combines an RIS with sleep control techniques to enable an energy-efficient RAN.

Some embodiments provide a hierarchical reinforcement learning based algorithm to maximize the energy efficiency in such a system.

Some embodiments combine RIS with sleep control to improve energy efficiency. RIS may increase the transmission channel capacity between base station and users.

Compared with conventional reinforcement learning such as Q-learning, the HRL-based algorithm disclosed herein enables higher exploration efficiency, since the hierarchical architecture reduces the exploration complexity.

According to one aspect, a method implemented in a network node operating as a meta-controller and configured to communicate with a wireless device, WD, and a plurality of sub-controllers is provided. The method includes determining a state of the meta-controller, the state of the meta-controller including traffic load ratios of the plurality of sub-controllers. The method also includes receiving an extrinsic reward, the extrinsic reward being based at least in part on an energy efficiency of a cell including the plurality of sub-controllers. The method also includes selecting a goal according to a policy, the selected goal being an on/off state of each of the plurality of sub-controllers, the policy being selected to increase the extrinsic reward. The method further includes configuring the plurality of sub-controllers with the selected goal and an indication of the policy for selecting the goal.

According to this aspect, in some embodiments, the extrinsic reward is based at least in part a ratio of a sum of throughputs of network nodes in the cell to a sum of power consumptions of the network nodes in the cell. In some embodiments, the extrinsic reward is further based at least in part on a penalty factor to avoid overloading and based at least in part on a number of network nodes in the cell that are overloaded. In some embodiments, maximizing the extrinsic reward includes maximizing a throughput of a link between the network node and a plurality of WDs via a reconfigurable intelligent surface, RIS. In some embodiments, the policy is one of a greedy policy and ε-greedy policy. In some embodiments, the greedy policy provides a selected goal that increases the extrinsic reward when a random number exceeds a threshold and provides a randomly selected goal when the random number does not exceed the threshold.

According to another aspect, a network node operating as a meta-controller and configured to communicate with a wireless device, WD, and a plurality of sub-controllers is provided. The network node includes processing circuitry configured to: determine a state of the meta-controller, the state of the meta-controller including traffic load ratios of the plurality of sub-controllers; receive an extrinsic reward, the extrinsic reward being based at least in part on an energy efficiency of a cell including the plurality of sub-controllers; select a goal according to a policy, the selected goal being an on/off state of each of the plurality of sub-controllers, the policy being selected to increase the extrinsic reward; and configure the plurality of sub-controllers with the selected goal and an indication of the policy for selecting the goal.

According to this aspect, in some embodiments, the extrinsic reward is based at least in part a ratio of a sum of throughputs of network nodes in the cell to a sum of power consumptions of the network nodes in the cell. In some embodiments, the extrinsic reward is further based at least in part on a penalty factor to avoid overloading and based at least in part on a number of network nodes in the cell that are overloaded. In some embodiments, maximizing the extrinsic reward includes maximizing a throughput of a link between the network node and a plurality of WDs via a reconfigurable intelligent surface, RIS. In some embodiments, the policy is one of a greedy policy and an ε-greedy policy. In some embodiments, the greedy policy provides a selected goal that increases the extrinsic reward when a random number exceeds a threshold and provides a randomly selected goal when the random number does not exceed the threshold.

According to yet another aspect, a method implemented in a network node operating as a sub-controller and configured to communicate with a wireless device (WD) and at least one network node operating as a meta-controller is provided. The method includes: receiving a goal and an indication of a policy from the meta-controller; receiving an intrinsic reward, the intrinsic reward being based at least in part on a ratio of a throughput of the sub-controller to a transmission power of the sub-controller; and selecting an action based at least in part on the goal and according to the policy, the action including adjusting the transmission power of the sub-controller to increase the intrinsic reward.

According to this aspect, in some embodiments, the intrinsic reward is further based at least in part on a penalty factor to avoid overloading and based at least in part on a number of network nodes in a cell that are overloaded. In some embodiments, maximizing the intrinsic reward includes maximizing a throughput of a link between the network node and a plurality of WDs via a reconfigurable intelligent surface, RIS. In some embodiments, the policy is one of a greedy policy and an ε-greedy policy. In some embodiments, the greedy policy provides a selected action that increases the intrinsic reward when a random number exceeds a threshold and provides a randomly selected action when the random number does not exceed the threshold. In some embodiments, the goal is an on/off state of the sub-controller.

According to another aspect, a network node operating as a sub-controller and configured to communicate with a wireless device (WD) and at least one network node operating as a meta-controller is provided. The network node includes processing circuitry configured to: receive a goal and an indication of a policy from the meta-controller; receive an intrinsic reward, the intrinsic reward being based at least in part on a ratio of a throughput of the sub-controller to a transmission power of the sub-controller; and select an action based at least in part on the goal and according to the policy, the action including adjusting the transmission power of the sub-controller to increase the intrinsic reward.

According to this aspect, in some embodiments, the intrinsic reward is further based at least in part on a penalty factor to avoid overloading and based at least in part on a number of network nodes in a cell that are overloaded. In some embodiments, maximizing the intrinsic reward includes maximizing a throughput of a link between the network node and a plurality of WDs via a reconfigurable intelligent surface, RIS. In some embodiments, the policy is one of a greedy policy and an ε-greedy policy. In some embodiments, the greedy policy provides a selected action that increases the intrinsic reward when a random number exceeds a threshold and provides a randomly selected action when the random number does not exceed the threshold. In some embodiments, the goal is an on/off state of the sub-controller.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
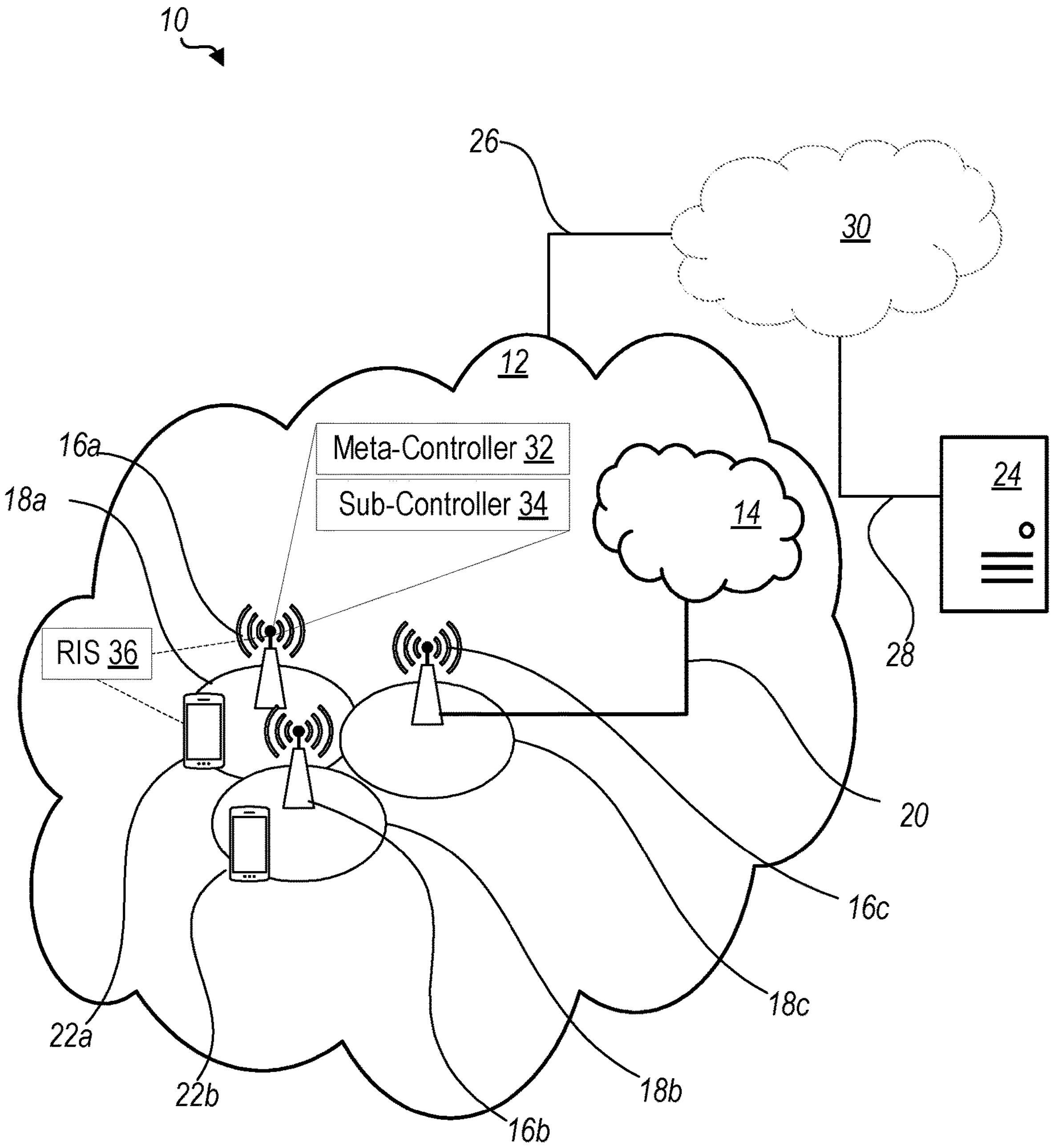
FIG. 1 is a schematic diagram of an example network architecture illustrating a communication system connected via an intermediate network to a host computer according to the principles in the present disclosure.

Before describing in detail example embodiments, it is noted that the embodiments reside primarily in combinations of apparatus components and processing steps related to reconfigurable intelligent surface (RIS)-assisted energy-efficient (EE) radio access networks (RAN) using hierarchical reinforcement learning. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises." "comprising." "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3$^{rd}$ party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) or a radio network node.

In some embodiments, the term macro base station (MBS) refers to a network node that is configured to operate as a meta-controller. The term small base station (SBS) refers to a network node that is configured to operate as a sub-controller. A network node may operate as one or both of a meta-controller and a sub-controller.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments provide reconfigurable intelligent surface (RIS)-assisted energy-efficient (EE) radio access network (RAN) using hierarchical reinforcement learning.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16*a*, 16*b*, 16*c* (referred to collectively as network nodes 16), such as NBs, eNBs, gNBs or other types of wireless access points, each defining a corresponding coverage area 18*a*, 18*b*, 18*c* (referred to collectively as coverage areas 18). Each network node 16*a*, 16*b*, 16*c* is connectable to the core network 14 over a wired or wireless connection 20. A first wireless device (WD) 22*a* located in coverage area 18*a* is configured to wirelessly connect to, or be paged by, the corresponding network node 16*a*. A second WD 22*b* in coverage area 18*b* is wirelessly connectable to the corresponding network node 16*b*. While a plurality of WDs 22*a*, 22*b* (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16. In some embodiments, the network node 16*a* may be configured to operate as a macro base station (MBS) and will be referred to herein as MBS 16*a*. In some embodiments, the network nodes 16*b* and 16*c* may be configured to operate as small base stations (SBSs) and will be referred to herein as SBS 16*b* and/or SBS 16*c*.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22*a*, 22*b* and the host computer 24. The connectivity may be described as an over-the-top (OTT) connection. The host computer 24 and the connected WDs 22*a*, 22*b* are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22*a*. Similarly, the network node 16 need not be aware of the future routing of an outgoing uplink communication originating from the WD 22*a* towards the host computer 24.

A network node 16*a* configured to operate as an MBS may be configured to include a meta-controller 32 which is configured to generate a transmission control signal to configure a transmission status of the at least one sub-controller, the transmission control signal being based at least in part on machine learning reinforced by feedback from at least one WD. A network node 16*b* configured to operate as an SBS may be configured to include a sub-controller 34 which is configured to determine a transmission status of the sub-controller based at least in part on machine learning reinforced by feedback from at least one WD. In some embodiments, a network node may be configured with both the meta-controller 32 and the sub-controller 34.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control. e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include a meta-controller 32 which is configured to generate a transmission control signal to configure a transmission status of the at least one sub-controller, the transmission control signal being based at least in part on machine learning reinforced by feedback from at least one WD. The processing circuitry 68 of the network node 16 may include, in addition to or instead of the meta-controller 32, a sub-controller 34 which is configured to determine a transmission status of the sub-controller based at least in part on machine learning reinforced by feedback from at least one WD.

In some embodiments, the network node 16 may be in communication with a WD 22 directly and/or via a reconfigurable intelligent surface (RIS) 36. In some embodiments, the RIS 36 and at least one sub-controller 34 are collocated.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
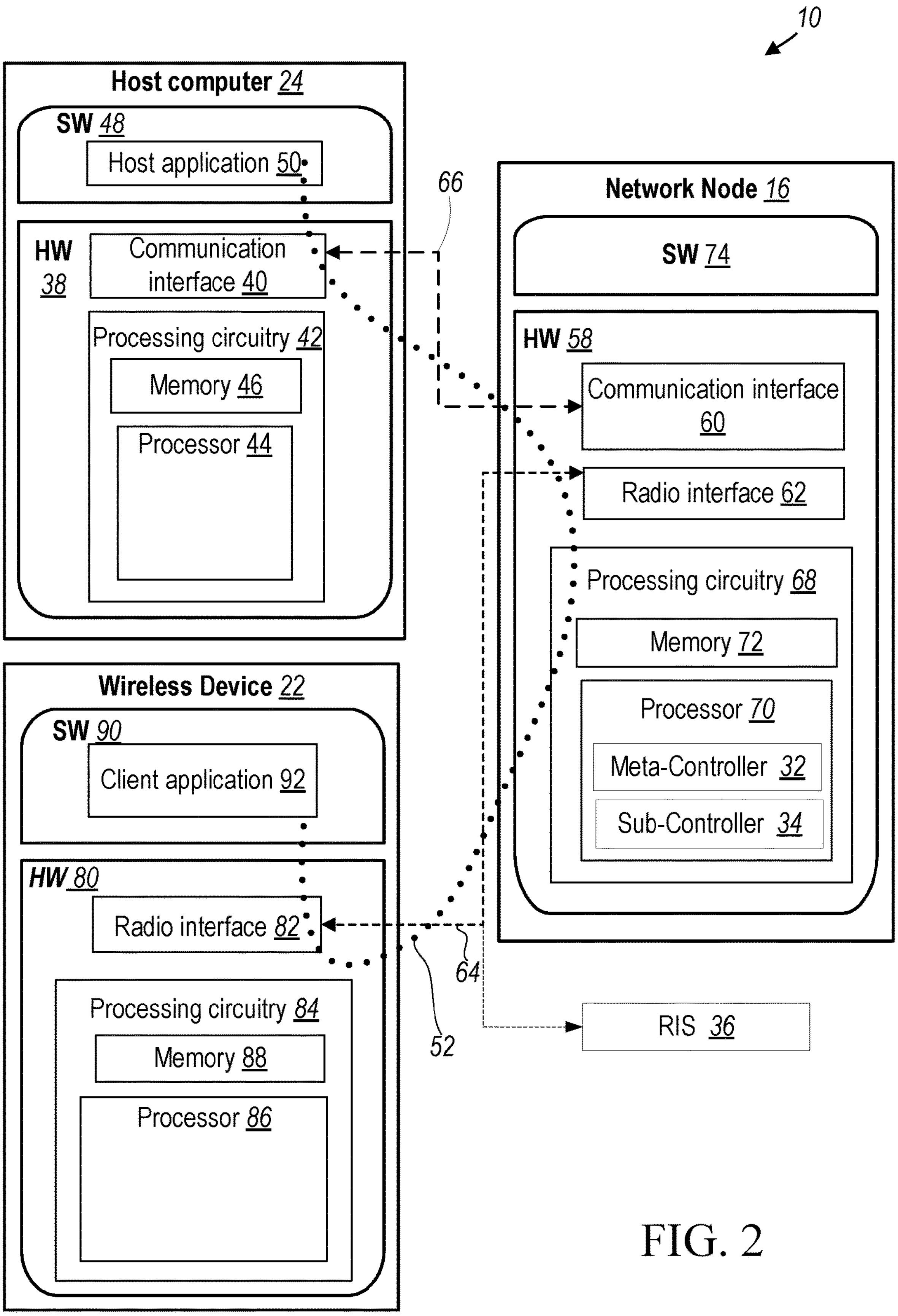
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors, etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as meta-controller 32, and sub-controller 34 as being within a respective processor or the same processor, it is contemplated that these units may be implemented such that a portion of the unit is stored in a corresponding memory within the processing circuitry. In other words, the units may be implemented in hardware or in a combination of hardware and software within the processing circuitry.

Figure 3:
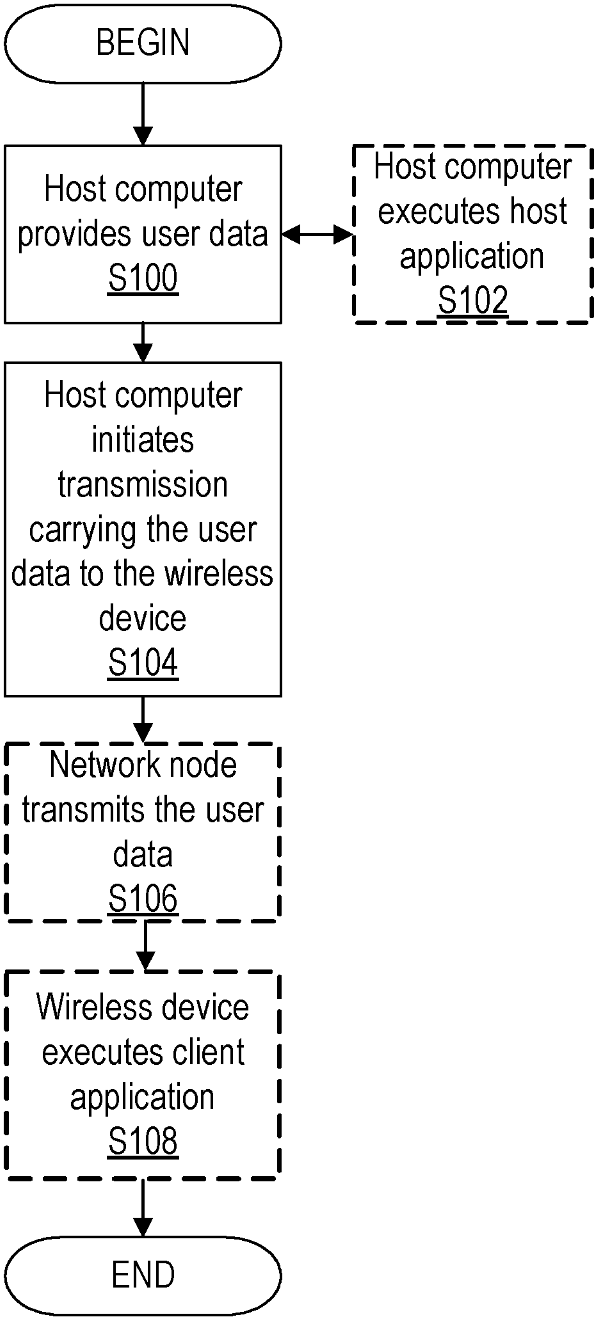
FIG. 3 is a flowchart illustrating example methods implemented in a communication system including a host computer, a network node and a wireless device for executing a client application at a wireless device according to some embodiments of the present disclosure.

FIG. 3 is a flowchart illustrating an example method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

Figure 4:
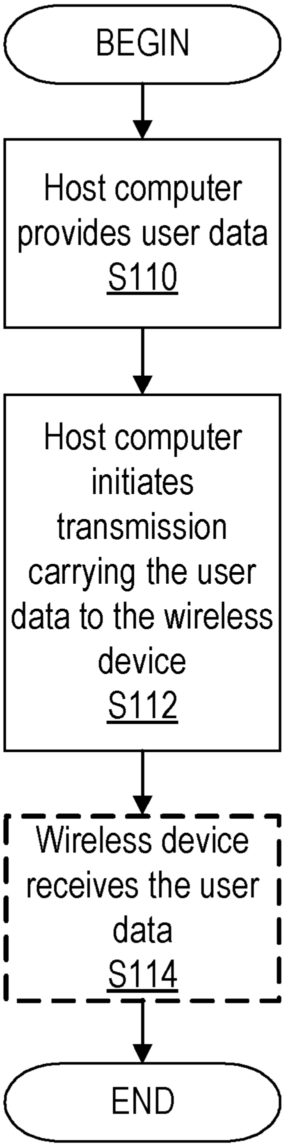
FIG. 4 is a flowchart illustrating example methods implemented in a communication system including a host computer, a network node and a wireless device for receiving user data at a wireless device according to some embodiments of the present disclosure.
Figure 5:
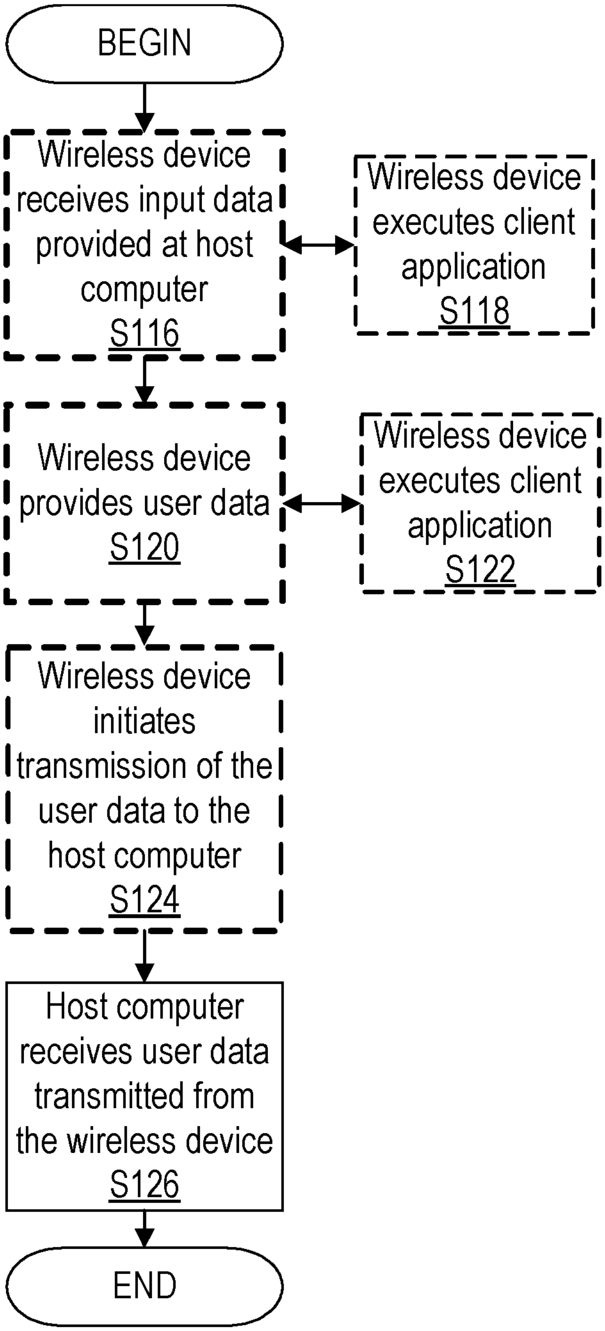
FIG. 5 is a flowchart illustrating example methods implemented in a communication system including a host computer, a network node and a wireless device for receiving user data from the wireless device at a host computer according to some embodiments of the present disclosure.

FIG. 4 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114). FIG. 5 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

Figure 6:
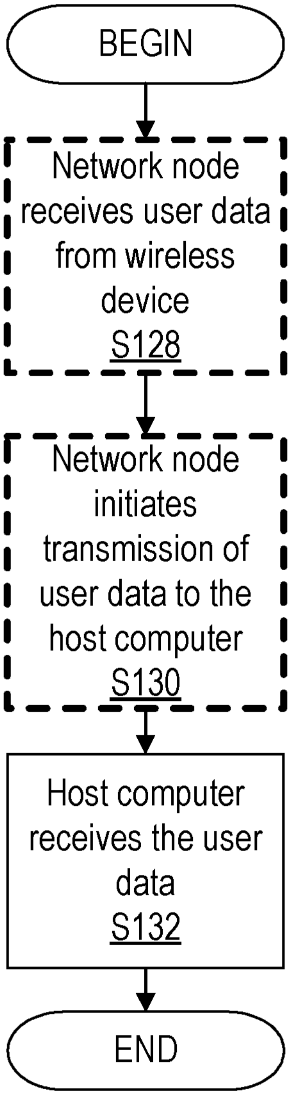
FIG. 6 is a flowchart illustrating example methods implemented in a communication system including a host computer, a network node and a wireless device for receiving user data at a host computer according to some embodiments of the present disclosure.

FIG. 6 is a flowchart illustrating an example method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
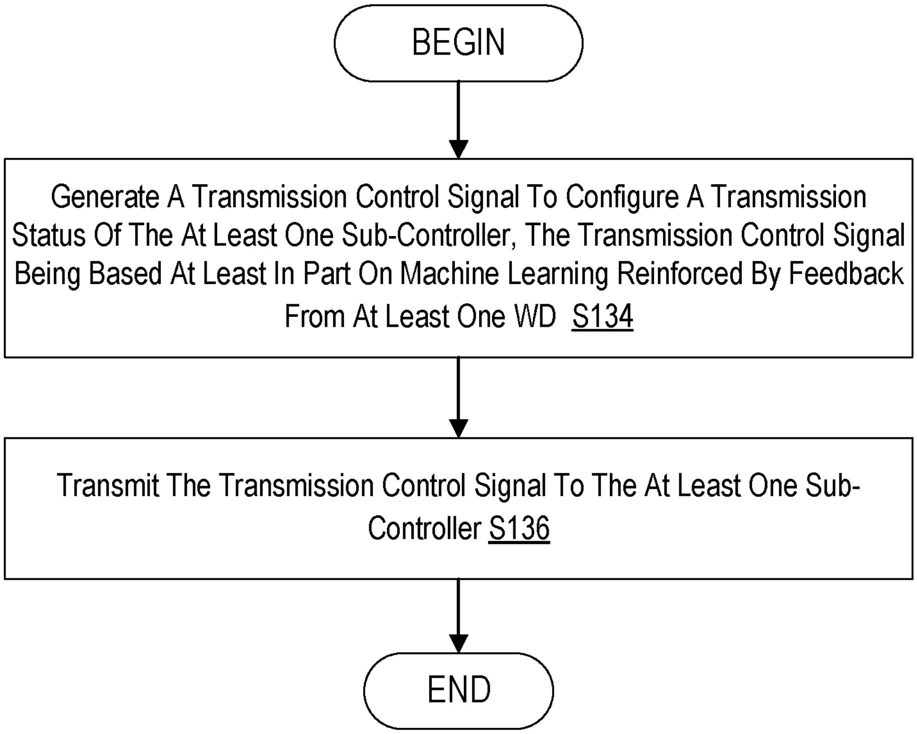
FIG. 7 is a flowchart of an example process in a network node for reconfigurable intelligent surface (RIS)-assisted energy-efficient (EE) radio access networks (RAN) using hierarchical reinforcement learning.

FIG. 7 is a flowchart of an example process in a network node 16 for reconfigurable intelligent surface (RIS)-assisted energy-efficient (EE) radio access network (RAN) using hierarchical reinforcement learning. One or more blocks described herein may be performed by one or more elements of network node 16 such as by one or more of processing circuitry 68 (including the meta-controller 32), processor 70, radio interface 62 and/or communication interface 60. Network node 16 such as via processing circuitry 68 and/or processor 70 and/or radio interface 62 and/or communication interface 60 is configured to generate a transmission control signal to configure a transmission status of the at least one sub-controller 34, the transmission control signal being based at least in part on machine learning reinforced by feedback from at least one WD 22 (Block S134). The process also includes transmitting the transmission control signal to the at least one sub-controller 34 (Block S136).

In some embodiments, the machine learning includes: generating at least one goal based at least in part on the feedback and transforming the at least one goal into at least one policy by which the at least one sub-controller 34 determines a transmission status. In some embodiments, the at least one goal includes increasing a gain of the link between the network node 16 and the WD 22 via a reconfigurable intelligent surface, RIS 36. In some embodiments, the gain is determined based at least in part on phase shifts applied to at least one reconfigurable intelligent surface, RIS 36. In some embodiments, the at least one goal includes decreasing power consumption of a network that includes the network node and the WD. In some embodiments, the at least one goal includes determining whether to change an on/off state of the at least one sub-controller.

Figure 8:
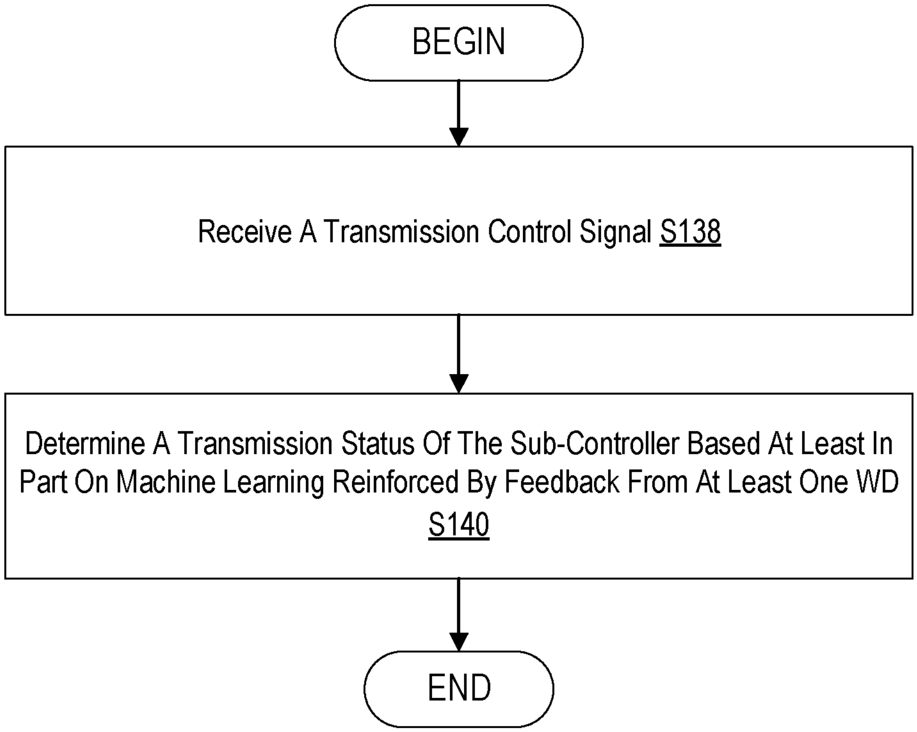
FIG. 8 is a flowchart of an example process in a wireless device for reconfigurable intelligent surface (RIS)-assisted energy-efficient (EE) radio access networks (RAN) using hierarchical reinforcement learning.

FIG. 8 is a flowchart of an example process in a network node 16 for reconfigurable intelligent surface (RIS)-assisted energy-efficient (EE) radio access network (RAN) using hierarchical reinforcement learning. One or more blocks described herein may be performed by one or more elements of network node 16 such as by one or more of processing circuitry 68 (including the sub-controller 34), processor 70, radio interface 62 and/or communication interface 60. Network node 16 such as via processing circuitry 68 and/or processor 70 and/or radio interface 62 and/or communication interface 60 is configured to receive a transmission control signal (Block S138). The process also includes determining a transmission status of the sub-controller 34 based at least in part on machine learning reinforced by feedback from at least one WD 22 (Block S140).

In some embodiments, the method also includes receiving a policy from the meta-controller 32, and determining an intrinsic reward based at least in part on the policy. In some embodiments, the policy is based at least in part on an exploration of at least one goal to maximize a long term reward. In some embodiments, a state of the sub-controller 34 is defined by a Markov decision process.

Figure 9:
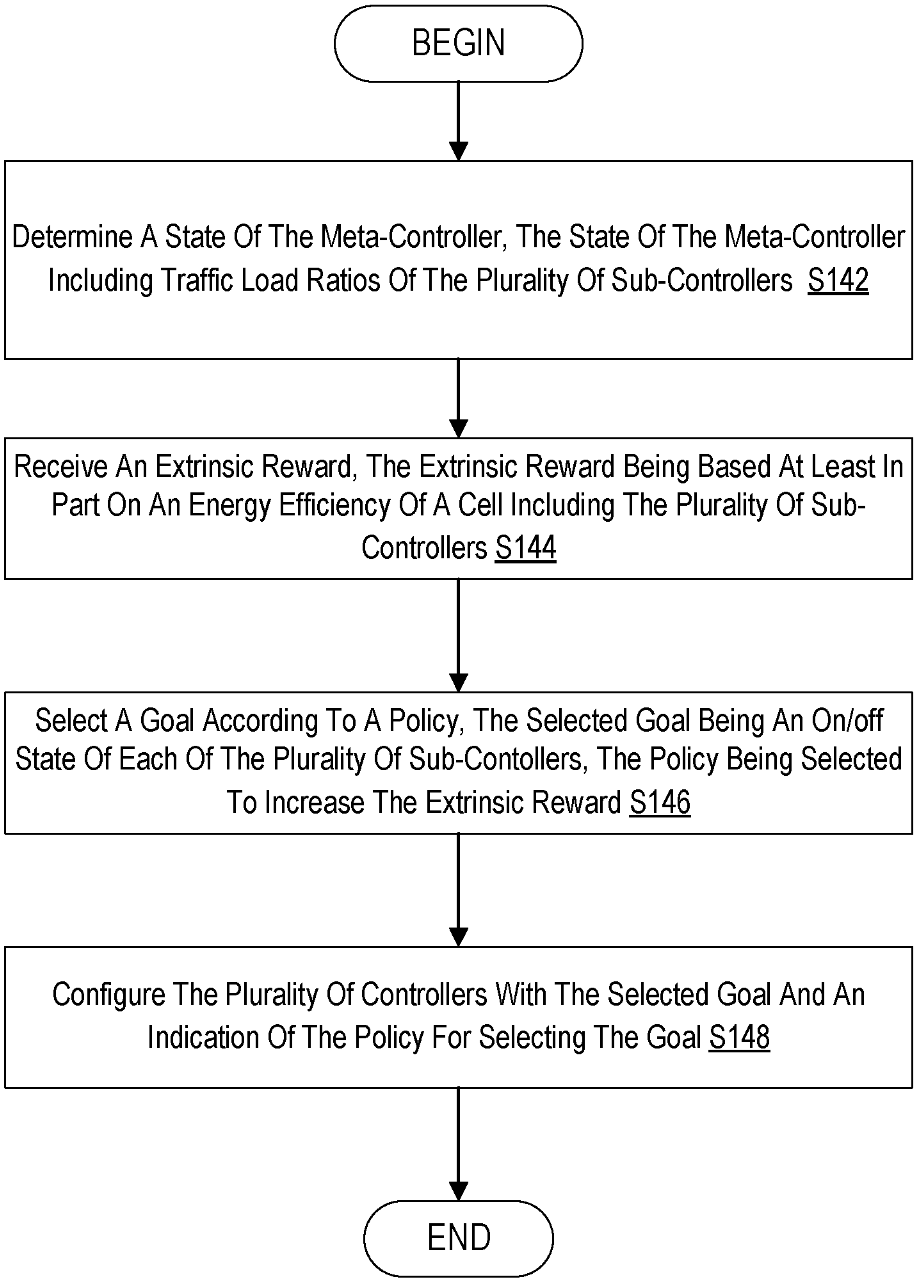
FIG. 9 is a flowchart of an example process in a network node for reconfigurable intelligent surface (RIS)-assisted energy-efficient (EE) radio access networks (RAN) using hierarchical reinforcement learning.

FIG. 9 is a flowchart of an example process in a network node 16 for reconfigurable intelligent surface (RIS)-assisted energy-efficient (EE) radio access network (RAN) using hierarchical reinforcement learning. One or more blocks described herein may be performed by one or more elements of network node 16 such as by one or more of processing circuitry 68 (including the meta-controller 32), processor 70, radio interface 62 and/or communication interface 60. Network node 16 such as via processing circuitry 68 and/or processor 70 and/or radio interface 62 and/or communication interface 60 is configured to determine a state of the meta-controller 32, the state of the meta-controller 32 including traffic load ratios of the plurality of sub-controllers 34 (Block S142). The method also includes receiving an extrinsic reward, the extrinsic reward being based at least in part on an energy efficiency of a cell including the plurality of sub-controllers 34 (Block S144). The method also includes selecting a goal according to a policy, the selected goal being an on/off state of each of the plurality of sub-controllers 34, the policy being selected to increase the extrinsic reward (Block S146). The method further includes configuring the plurality of sub-controllers 34 with the selected goal and an indication of the policy for selecting the goal (Block S148).

According to this aspect, in some embodiments, the extrinsic reward is based at least in part a ratio of a sum of throughputs of network nodes in the cell to a sum of power consumptions of the network nodes 16 in the cell. In some embodiments, the extrinsic reward is further based at least in part on a penalty factor to avoid overloading and based at least in part on a number of network nodes 16 in the cell that are overloaded. In some embodiments, maximizing the extrinsic reward includes maximizing a throughput of a link between the network node and 16 a plurality of WDs 22 via a reconfigurable intelligent surface, RIS 36. In some embodiments, the policy is one of a greedy policy and an ε-greedy policy. In some embodiments, the greedy policy provides a selected goal that increases the extrinsic reward when a random number exceeds a threshold and provides a randomly selected goal when the random number does not exceed the threshold.

Figure 10:
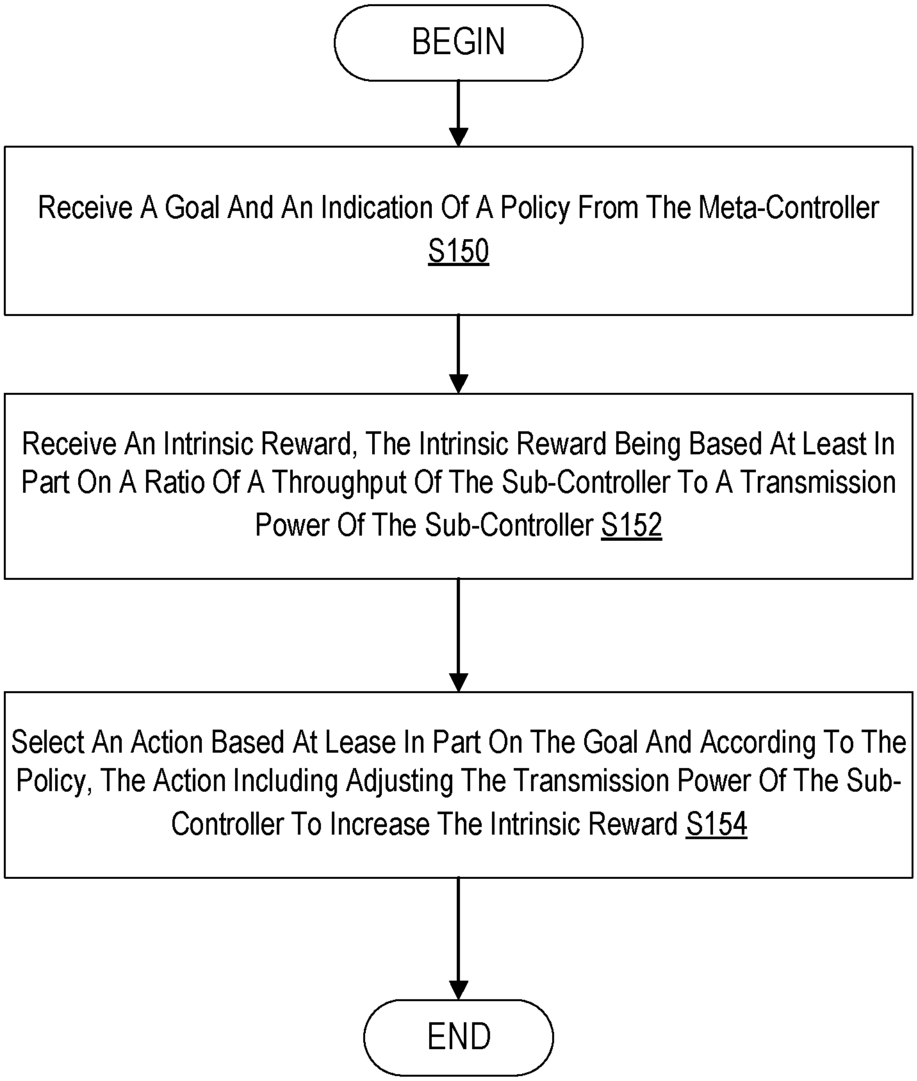
FIG. 10 is a flowchart of an example process in a wireless device for reconfigurable intelligent surface (RIS)-assisted energy-efficient (EE) radio access networks (RAN) using hierarchical reinforcement learning.

FIG. 10 is a flowchart of an example process in a network node 16 for reconfigurable intelligent surface (RIS)-assisted energy-efficient (EE) radio access network (RAN) using hierarchical reinforcement learning. One or more blocks described herein may be performed by one or more elements of network node 16 such as by one or more of processing circuitry 68 (including the sub-controller 34), processor 70, radio interface 62 and/or communication interface 60. Network node 16 such as via processing circuitry 68 and/or processor 70 and/or radio interface 62 and/or communication interface 60 is configured to receive a goal and an indication of a policy from the meta-controller 32 (Block S150). The process includes receiving an intrinsic reward, the intrinsic reward being based at least in part on a ratio of a throughput of the sub-controller 34 to a transmission power of the sub-controller 34 (Block S152). The process also includes selecting an action based at least in part on the goal and according to the policy, the action including adjusting the transmission power of the sub-controller 34 to increase the intrinsic reward (Block S154).

According to this aspect, in some embodiments, the intrinsic reward is further based at least in part on a penalty factor to avoid overloading and based at least in part on a number of network nodes 16 in a cell that are overloaded. In some embodiments, maximizing the intrinsic reward includes maximizing a throughput of a link between the network node 16 and a plurality of WDs 22 via a reconfigurable intelligent surface, RIS 36. In some embodiments, the policy is one of a greedy policy and an ε-greedy policy. In some embodiments, the greedy policy provides a selected action that increases the intrinsic reward when a random number exceeds a threshold and provides a randomly selected action when the random number does not exceed the threshold. In some embodiments, the goal is an on/off state of the sub-controller 34.

Having described the general process flow of arrangements of the disclosure and having provided examples of hardware and software arrangements for implementing the processes and functions of the disclosure, the sections below provide details and examples of arrangements for reconfigurable intelligent surface (RIS)-assisted energy-efficient (EE) radio access networks (RAN) using hierarchical reinforcement learning.

Some embodiments provide reconfigurable intelligent surface (RIS)-assisted energy-efficient (EE) radio access networks (RAN) using hierarchical reinforcement learning.

Figure 11:
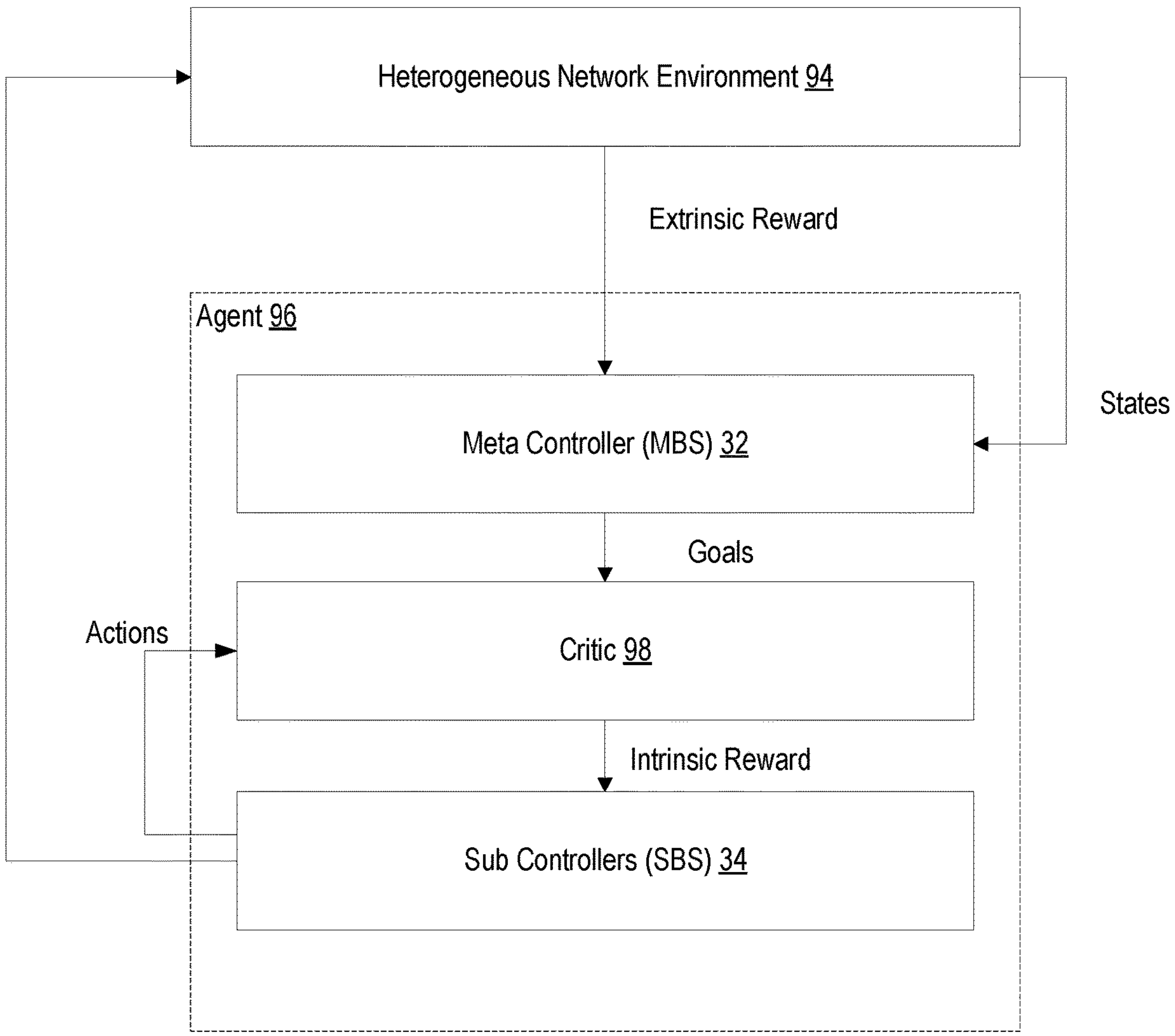
FIG. 11 is a block diagram of an example implementation of hierarchical reinforced learning for controlling sleep states of at least one sub-controller.

FIG. 11 shows a heterogeneous network environment 94 that includes one network node 16*a* operating as a macro base station (MBS) and having a meta-controller 32 and several network nodes 16*b*, 16*c* operating as small base stations (SBSs) and having sub-controllers 34. The SBSs 16*b*, 16*c* may switch to the sleep mode when the traffic demand drops, which will reduce the energy consumption. It is assumed the MBS 16*a* can take over the active wireless devices (WDs) 22 that were previously associated with those small cells. On the other hand, reconfigurable intelligent surfaces (RIS) 36 may be deployed to reflect the signal from the MBS 16*a* and mitigate the high penetration loss of direct transmissions. Energy may be saved in at least two ways: (i) the meta-controller 32 decides the on/off status of SBSs 16*b*, 16*c* when traffic load changes, and (ii) the sub-controller 34 decides the transmission power of active SBSs 16. Note that although reference is made to two SBSs 16*b* and 16*c*, there may be more than two SBSs configured to operate as described herein with respect to SBSs 16*b*, 16*c*.

It is assumed that WDs 22 can receive the signal from network nodes (NN) 16 by direct and indirect transmissions. The direct link is considered non-line-of-sight (NLOS) transmission due to the dense buildings in the urban area. The baseband equivalent channel between a network node 16 and a WD 22 is given by:

$$H_{B,k} = g_{b,k} h_{b,k} \tag{A}$$

where $g_{b,k}$ is the path loss from NN 16 to WD 22, and $h_{b,k}$ is a complex Gaussian distributed random vector with zero mean and unit variance.

The indirect link consists of the NN-RIS and RIS-WD links. Given that RIS 36 are designed to be deployed on the top or surface of tall buildings, the NN-RIS link is assumed to be line-of-sight (LOS) transmission:

$$H_{B,R} = g_{b,r}[h_1, h_2, \ldots, h_N] \tag{B}$$

where N is the number of RIS elements, $g_{b,r}$ is the path loss between BS and RIS, and $h_N$ is the phase difference.

Then, the RIS 36 is configured to reflect the signal to WDs 22 via a phase shift vector $\sigma=[\varepsilon_1, \varepsilon_2, \ldots, \varepsilon_N]$, and each $\varepsilon_N=\exp(j\theta_N)$, where exp is the natural exponential function, j is the square root of −1, and $\theta_N$ is the phase shift of RIS element N.

Considering the complex environment surrounding the WD 22, the RIS-WD link is presumed to be NLOS transmission and:

$$H_{R,k} = g_{b,r}\left[h'_{1,k}, h'_{2,k}, \ldots, h'_{N,k}\right] \quad \text{(C)}$$

where $g_{b,r}$ is the path loss between RIS and WD k, and $$h'_{N,k}$$

is the small scale fading of the signal reflected by the RIS element N.

Finally, the channel gain from NN j to WD k is:

$$G_{j,k} = \left|H_{B,k} + H_{R,k}\sigma H^{Tr}_{B,R}\right| \quad \text{(D)}$$

where $$H^{Tr}_{B,R}$$

means the transpose matrix of $H_{B,R}$.

For phase shift control, assume the channel state information (CSI) of a NN 16 and WDs 22 is perfectly shared between NN 16 and RIS 36 by wired transmissions such as optical fibers, and the CSI includes average channel gain, received signal phase and fading distribution. The RIS phase shift will take the same phase as $H_{B,k}$, and the total received signal will be strengthened.

The energy consumption model for an SBS **16*b*, 16*c*** is:

$$P_{in}\begin{cases} P_0 + \omega P_{out}, & \text{if } 0 < P_{out} \le P_{max} \\ P_{sleep}, & \text{if } P_{out} = 0 \end{cases} \quad \text{(E)}$$

where $P_0$ is the fixed power consumption, Φ is the slope of load-dependent power consumption, $P_{out}$ is the transmission power, $P_{max}$ is the maximum transmission power, and $P_{sleep}$ is the constant power consumption in sleep mode.

An HRL algorithm may be applied to optimize the energy efficiency of the system. The HRL agent 96 consists of two controllers, namely a meta-controller 32 and a sub-controller 34. A Markov decision process (MDP) tuple<States, Action, Transition probability, Reward, Goal> is used to describe these two controllers. Based on the current state, the meta-controller 32 generates high-level goals for sub-controllers 34. Then, these goals are transformed into high-level policies by the critic 98. The critic 98 may be collocated with the meta-controller 32 in the MBS **16*a* and the functions of the critic 98 may be implemented by the processing circuitry 68 of the network node 16. Consequently, the sub-controller 34 chooses low-level actions according to high-level policies, and receives an intrinsic reward. The meta-controller 32 may receive an extrinsic reward from the environment, and select new goals for the sub-controller 34. An idea behind the HRL is to introduce hierarchical architecture in RL. In particular, the meta-controller 32 will produce high-level policies to guide the low-level action selection of the sub-controller 34**.

The meta-controller 32 is responsible, among other things, for the high-level policies for the HRL agent 96. The MBS **16*a* includes a meta-controller 32**, and its Markov decision processes (MDPs):

State: The state of the meta-controller 32 consists of the traffic load ratio of SBSs **16*b*, 16*c***:

$$s_{meta} = \left\{d_{SBS,1}, d_{SBS,2}, \ldots, d_{SBS,j}, \ldots, d_{SBS,N_{SBS}}\right\} \quad \text{(F)}$$

Where $d_{SBS,j}$ is the traffic load ratio of SBS j (i.e., traffic demand (buffer size) of WD/bearer to maximum traffic load of the SBS j), which is assumed to be a tuned constant value to normalize the current traffic load of SBS), and $N_{SBS}$ is the total number of SBSs **16*b*, 16*c***.

Goal: With the traffic load status of the SBSs **16*b*, 16*c*, the MBS 16*s* can generate high-level policies for the SBSs 16*b*, 16*c*. The goal $g_{meta}$ is turning on/off the SBSs 16*b*, 16*c***:

$$g_{meta} = \left\{q_{SBS,1}, q_{SBS,2}, \ldots, q_{SBS,j}, \ldots q_{SBS,N_{SBS}}\right\} \quad \text{(G)}$$

where $q_{SBS,j}$ is a binary variable to indicate the on/off status of SBSs **16*b*, 16*c***. $q_{SBS,j}=1$ means keeping SBS j active, otherwise $q_{SBS,j}=0$ denotes turning off SBS j to save energy.

Extrinsic reward: The meta-controller 32 focuses more on the overall performance of the whole cell. Accordingly, the extrinsic reward is given by the total energy efficiency of the whole cell:

$$r_{ex} = \frac{\sum_{j=1}^{N_{BS}} W_j}{\sum_{j=1}^{N_{BS}} P_j} - \tau n_{od} \quad \text{(H)}$$

where NBs is the total number of BSs (network nodes 16) in the cell, $W_j$ is the throughput of BS j, $P_j$ is the power consumption of BS j, $n_{od}$ is the number of BSs 16 that are overloaded. Here, τ is a penalty factor to prevent the overloading. Overload occurs, for example, when the channel capacity of the network node 16 is unable to satisfy the demand of WDs 22.

For the sub-controller 34, the Q-values are updated by:

$$Q^{new}_{meta}(s_{meta}, g_{meta}) = (1-\alpha)Q^{old}_{meta}(s_{meta}, g_{meta}) + \alpha\left(r_{ex} + \gamma\max_{g_{meta}}\left(Q^{old}_{meta}(s'_{meta}, g_{meta})\right)\right) \quad \text{(I)}$$

where $s'_{meta}$ denotes the next state, α is the learning rate, and γ is the discount function (0<α<1, 0<γ<1).

$$Q^{old}_{meta} \text{ and } Q^{new}_{meta}$$

denote old and new Q-values for meta-controller 32, which means the accumulated reward.

Then an ε-greedy policy for the goal selection may be used:

$$g = \begin{cases} \arg\max_g Q(s_{meta}, g), & \text{if rand} > \varepsilon \\ \text{random goal selection}, & \text{if rand} \le \varepsilon \end{cases} \quad \text{(J)}$$

where rand is a random number between 0 and 1, and $0<\varepsilon<1$ is a preset fixed number. ε-greedy policy can balance the exploration and exploitation of goals to maximize the long-term reward.

Then, each SBS 16*b*, 16*c* is regarded as a sub-controller 34. The MDP of the sub-controller 34 may be defined by:

State: The state $s_{sub}$ of SBS j is defined by its traffic load ratio $s_{sub}=\{d_{SBS}\}$, which is given by:

$$d_{SBS}=\frac{D_{j,t}}{D_{j,max}} \tag{K}$$

where $D_{j,t}$ is the traffic load at time slot t. $D_{j,max}$ is the max traffic load of SBS j, which is considered a constant value to normalize the current traffic load of SBS j. Here it may be assumed that the daily traffic load follows fixed patterns, and the max traffic load can be extracted by observing the daily traffic volume.

Action: Based on $s_{sub}$, the SBS 16*b*, 16*c* may change its transmission power $P_{SBS}$ to adapt to the traffic demand. Then, the action is defined by $s_{sub}=\{P_{SBS}\}$.

Intrinsic reward: The intrinsic reward $r_{in}$ of sub-controller 34 is:

$$r_{in}=\frac{W_j}{P_{SBS}}-\tau \tag{L}$$

where $W_j$ is the throughput of SBS j, t is the penalty for overloading. Here the overloading means that the current traffic demand has exceeded the transmission capability of one SBS 16*b*, 16*c*, and then the attached WDs 22 may experience a long delay. With this definition, the sub-controller 34 aims at maximizing its own EE and preventing overloading.

The Q-values of sub-controller 34 are updated by:

$$Q_{sub}^{new}(s_{meta}, g_{meta}, a_{sub}) = (1-\alpha)Q_{sub}^{old}(s_{sub}, g_{meta}, a_{sub})+\alpha\left(r_{in}+\gamma\max_{a_{sub}}\left(Q_{sub}^{old}(s'_{sub}, g'_{meta}, a_{sub})\right)\right) \tag{M}$$

where $$s'_{sub}$$

is the next state, $$g'_{meta}$$

is the next goal generated by meta-controller 32.

$$Q_{sub}^{old} \text{ and } Q_{sub}^{new}$$

denote old and new Q-values for sub-controller 34.

Similarly, ε-greedy policy may be used for the goal selection:

$$a=\begin{cases}\arg\max_{a} Q(s_{sub}, g_{meta}, a), & \text{if rand} > \varepsilon \\ \text{random action selection}, & \text{if rand} \le \varepsilon\end{cases} \tag{N}$$

Note that the discount factor γ, learning rate α, and ε value in equation (J) and (N) are all tunable parameters in the proposed solution. Here, a grid-search method may be deployed by trying different configurations, and selecting the best parameter combinations accordingly.

Figure 12:
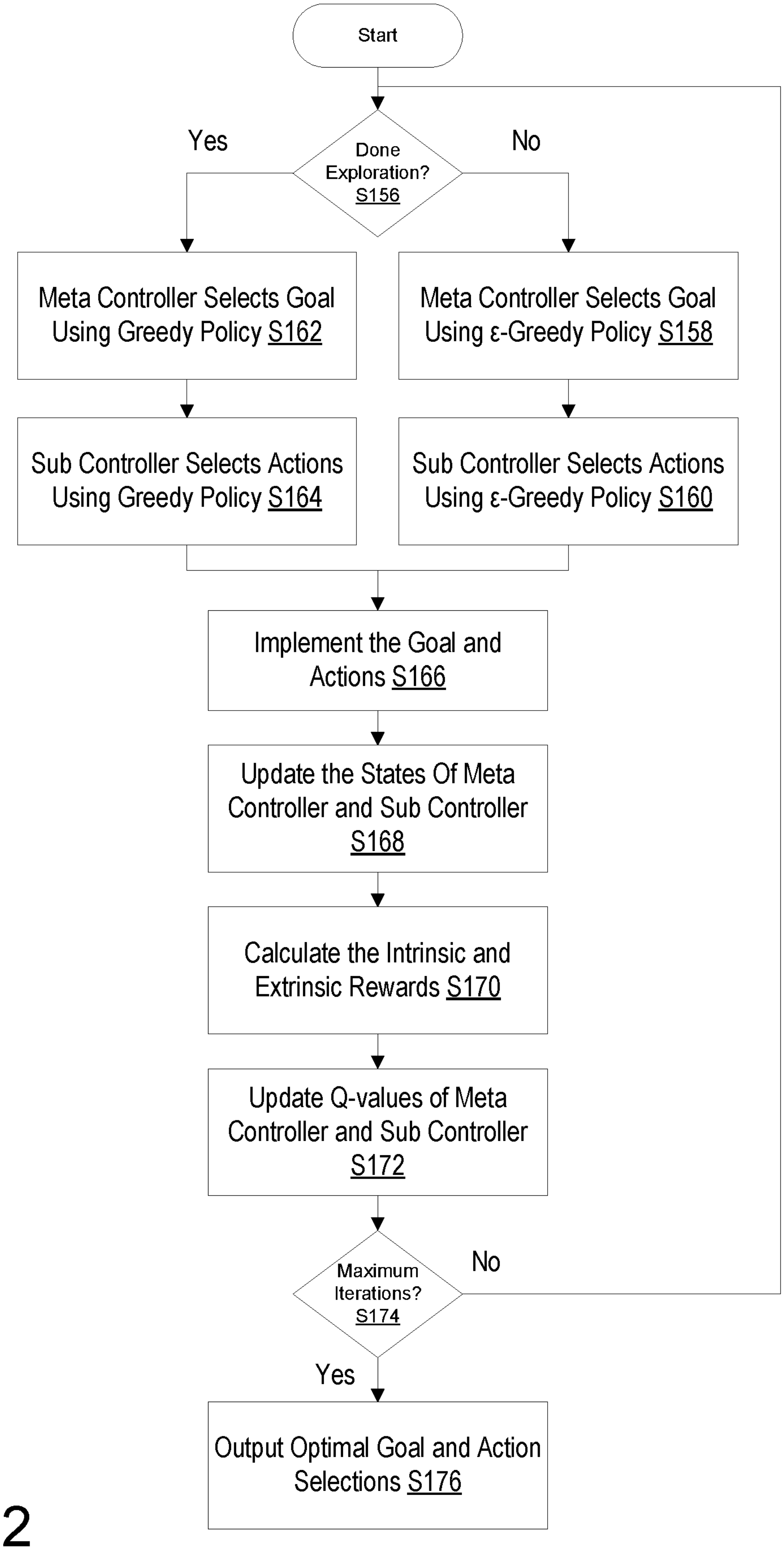
FIG. 12 is a flowchart of an example process for machine learning reinforced by feedback from the network environment.

A flowchart of an example process according to principles set forth herein is shown in FIG. 12. During an exploration phase (Block S156), the meta-controller 32 selects a goal using an ε-greedy policy (Block S158). The sub-controllers 34 select actions using the ε-greedy policy (Block S160). When exploration is completed (Block S156), the meta-controller 32 selects a goal using a greedy policy (Block S162), and the sub-controllers 34 select actions using the greedy policy (Block S164). After the goals and actions have been selected, they are implemented (Block S166), and states of the meta-controller 32 and the sub-controllers 34 are updated (Block S168). Also, the intrinsic and extrinsic rewards are computed (Block S170). The Q-values of the meta-controller 32 and the sub-controllers 34 may be updated. When the maximum number of iterations are performed (Block S174), the optimal goals and actions are output (Block S176). If the maximum number of iterations have not been performed (Block S174), then the process continues at Block S156.

Some embodiments may include one or more of the following steps:

Step 1: Initializing all system status. Setting configurable parameters including: exploration iteration numbers, maximum iteration number.

Step 2: Based on predefined exploration time, decide the goal and action selection strategies, i.e., greedy policy or ε-greedy policy using equations (J) and (N).

Step 3: After goals and actions are selected and implemented, the system state is updated, and the intrinsic and extrinsic rewards are calculated using equations (H) and (L).

Step 4: Then update the Q-values of the meta-controller 32 and sub-controller 34 as equations (I) and (M), respectively.

Step 5: If the HRL agent 96 reaches maximum iterations, then it will produce the best goal and action selection sequence. Otherwise, it will repeat Steps 1 to 4 until the maximum iteration number.

Figure 13:
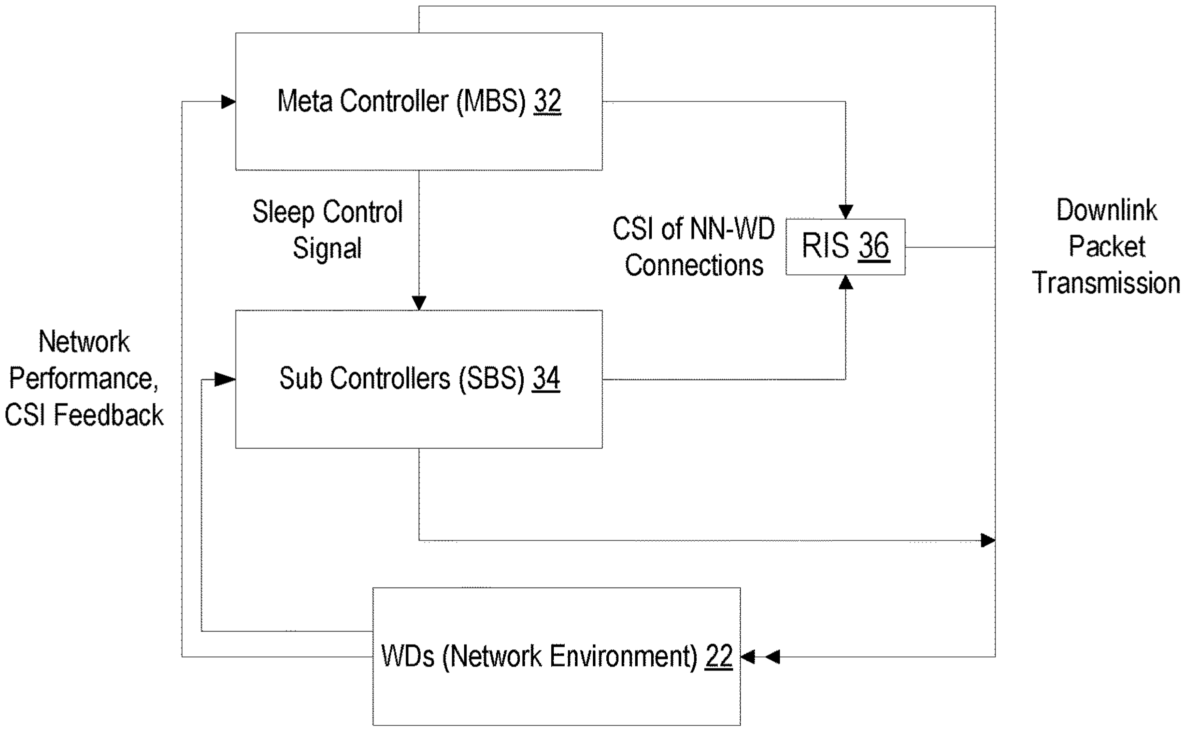
FIG. 13 is a block diagram of another example implementation of hierarchical reinforced learning for controlling sleep states of at least one sub-controller.

An example of information flow between nodes is shown in FIG. 13. The meta-controller 32 may send a sleep control signal to a plurality of sub-controllers 34. The channel state information (CSI) of network node-to-wireless connections may be employed to configure the RIS 36. The meta-controller 32 and the sub-controllers 34 may share network performance information and/or CSI feedback from the WDs 22 in the network environment. One or more of the WDs 22 may be configured to receive downlink packet transmission from one or more of the meta-controller 32, a sub-controller 34 and the RIS 36.

Some embodiments may include one or more of the following:

Embodiment A1. A network node operating as a meta-controller and configured to communicate with a wireless device (WD) and at least one sub-controller, the network node configured to, and/or comprising a radio interface and/or comprising processing circuitry configured to:

generate a transmission control signal to configure a transmission status of the at least one sub-controller, the transmission control signal being based at least in part on machine learning reinforced by feedback from at least one WD; and transmit the transmission control signal to the at least one sub-controller.

Embodiment A2. The network node of Embodiment A1, wherein the machine learning includes:

generating at least one goal based at least in part on the feedback;

transforming the at least one goal into at least one policy by which the at least one sub-controller determines a transmission status.

Embodiment A3. The network node of Embodiment A2, wherein the at least one goal includes increasing a gain of the link between the network node and the WD via a reconfigurable intelligent surface, RIS.

Embodiment A4. The network node of Embodiment A3, wherein the gain is determined based at least in part on phase shifts applied to at least one reconfigurable intelligent surface, RIS.

Embodiment A5. The network node of Embodiment A2, wherein the at least one goal includes decreasing power consumption of a network that includes the network node and the WD.

Embodiment A6. The network node of any of Embodiments A2-A5, wherein the at least one goal includes determining whether to change an on/off state of the at least one sub-controller.

Embodiment B1. A method implemented in a network node operating as a meta-controller and configured to communicate with a wireless device and at least one sub-controller, WD, the method comprising:

generating a transmission control signal to configure a transmission status of the at least one sub-controller, the transmission control signal being based at least in part on machine learning reinforced by feedback from at least one WD; and transmitting the transmission control signal to the at least one sub-controller.

Embodiment B2. The method of Embodiment B1, wherein the machine learning includes:

generating at least one goal based at least in part on the feedback;

transforming the at least one goal into at least one policy by which the at least one sub-controller determines a transmission status.

Embodiment B3. The method of Embodiment B2, wherein the at least one goal includes increasing a gain of the link between the network node and the WD via a reconfigurable intelligent surface, RIS.

Embodiment B4. The method of Embodiment B3, wherein the gain is determined based at least in part on phase shifts applied to at least one reconfigurable intelligent surface, RIS.

Embodiment B5. The method of Embodiment B2, wherein the at least one goal includes decreasing power consumption of a network that includes the network node and the WD.

Embodiment B6. The method of any of Embodiments B2-B5, wherein the at least one goal includes determining whether to change an on/off state of the at least one sub-controller.

Embodiment C1. A network node configured to operate as a sub-controller configured to communicate with a wireless device (WD) and at least one network node operating as a meta-controller, the network node configured to, and/or comprising a radio interface and/or comprising processing circuitry configured to:

receive a transmission control signal; and determine a transmission status of the sub-controller based at least in part on machine learning reinforced by feedback from at least one WD.

Embodiment C2. The network node of Embodiment C1, wherein the network node, radio interface and/or processing circuitry are further configured to:

receive a policy from the meta-controller; and determine an intrinsic reward based at least in part on the policy.

Embodiment C3. The network node of Embodiment C2, wherein the policy is based at least in part on an exploration of at least one goal to maximize a long term reward.

Embodiment C4. The network node of any of Embodiments C1-C3, wherein a state of the sub-controller is defined by a Markov decision process.

Embodiment D1. A method implemented in a network node operating as a sub-controller and configured to communicate with a wireless device (WD) and at least one network node operating as a meta-controller, the method comprising:

receiving a transmission control signal; and determining a transmission status of the sub-controller based at least in part on machine learning reinforced by feedback from at least one WD.

Embodiment D2. The method of Embodiment D1, further comprising:

receiving a policy from the meta-controller; and determining an intrinsic reward based at least in part on the policy.

Embodiment D3. The method of Embodiment D2, wherein the policy is based at least in part on an exploration of at least one goal to maximize a long term reward.

Embodiment D4. The method of any of Embodiments D1-D3, wherein a state of the sub-controller is defined by a Markov decision process.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
|---|---|
| BS | Base stations |
| CSI | Channel state information |
| EE | Energy efficiency |
| HRL | Hierarchical reinforcement learning |
| IOT | Internet of things |
| LOS | Line-of-sight |
| MBS | Main base stations |
| MDP | Markov decision process |
| NLOS | non-line-of-sight |
| MBS | Main base stations |
| RAN | Radio access network |
| MBS | Main base stations |
| RL | Reinforcement learning |
| SBS | Small base stations |
| SINR | Signal-to-interference-plus-noise ratio |
| UE | User equipment |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method implemented in a network node operating as a meta-controller and configured to communicate with a wireless device, WD, and a plurality of sub-controllers, the method comprising:

determining a state of the meta-controller, the state of the meta-controller including traffic load ratios of the plurality of sub-controllers;

receiving an extrinsic reward, the extrinsic reward being based at least in part on an energy efficiency of a cell including the plurality of sub-controllers, the energy efficiency being a ratio of a sum of throughputs of network nodes in the cell to a sum of power consumptions of the network nodes in the cell;

selecting a goal according to a policy, the selected goal being an on/off state of each of the plurality of sub-controllers, the policy being selected to increase the extrinsic reward; and configuring the plurality of sub-controllers with the selected goal and an indication of the policy for selecting the goal.

2. The method of claim 1, wherein the extrinsic reward is further based at least in part on a penalty factor to avoid overloading and based at least in part on a number of network nodes in the cell that are overloaded.

3. The method of claim 2, wherein maximizing the extrinsic reward includes maximizing a throughput of a link between the network node and a plurality of WDs via a reconfigurable intelligent surface, RIS.

4. The method of claim 2, wherein the policy is one of a greedy policy and an ε-greedy policy.

5. The method of claim 1, wherein maximizing the extrinsic reward includes maximizing a throughput of a link between the network node and a plurality of WDs via a reconfigurable intelligent surface, RIS.

6. The method of claim 1, wherein the policy is one of a greedy policy and an ε-greedy policy.

7. The method of claim 6, wherein the greedy policy provides a selected goal that increases the extrinsic reward when a random number exceeds a threshold and provides a randomly selected goal when the random number does not exceed the threshold.

8. A network node operating as a meta-controller and configured to communicate with a wireless device, WD, and a plurality of sub-controllers, the network node comprising processing circuitry configured to:

determine a state of the meta-controller, the state of the meta-controller including traffic load ratios of the plurality of sub-controllers;

receive an extrinsic reward, the extrinsic reward being based at least in part on an energy efficiency of a cell including the plurality of sub-controllers, the energy efficiency being a ratio of a sum of throughputs of network nodes in the cell to a sum of power consumptions of the network nodes in the cell;

select a goal according to a policy, the selected goal being an on/off state of each of the plurality of sub-controllers, the policy being selected to increase the extrinsic reward; and configure the plurality of sub-controllers with the selected goal and an indication of the policy for selecting the goal.

9. The network node of claim 8, wherein the extrinsic reward is further based at least in part on a penalty factor to avoid overloading and based at least in part on a number of network nodes in the cell that are overloaded.

10. The network node of claim 8, wherein maximizing the extrinsic reward includes maximizing a throughput of a link between the network node and a plurality of WDs via a reconfigurable intelligent surface, RIS.

11. The network node of claim 8, wherein the policy is one of a greedy policy and an ε-greedy policy.

12. The network node of claim 11, wherein the greedy policy provides a selected goal that increases the extrinsic reward when a random number exceeds a threshold and provides a randomly selected goal when the random number does not exceed the threshold.

13. A method implemented in a network node operating as a sub-controller and configured to communicate with a wireless device (WD) and at least one network node operating as a meta-controller, the method comprising:

receiving a goal and an indication of a policy from the meta-controller;

receiving an intrinsic reward, the intrinsic reward being based at least in part on a ratio of a throughput of the sub-controller to a transmission power of the sub-controller; and selecting an action based at least in part on the goal and according to the policy, the action including adjusting the transmission power of the sub-controller to increase the intrinsic reward.

14. The method of claim 13, wherein the intrinsic reward is further based at least in part on a penalty factor to avoid overloading and based at least in part on a number of network nodes in a cell that are overloaded.

15. The method of claim 14, wherein maximizing the intrinsic reward includes maximizing a throughput of a link between the network node and a plurality of WDs via a reconfigurable intelligent surface, RIS.

16. The method of claim 13, wherein the policy is one of a greedy policy and an ε-greedy policy.

17. The method of claim 16, wherein the greedy policy provides a selected action that increases the intrinsic reward when a random number exceeds a threshold and provides a randomly selected action when the random number does not exceed the threshold.

18. The method of claim 13, wherein the goal is an on/off state of the sub-controller.

* * * * *